United States Patent
Tene

(10) Patent No.: US 10,078,433 B2
(45) Date of Patent: Sep. 18, 2018

(54) SHARING A TEMPLATE FILE

(71) Applicant: Dropbox, Inc., San Francisco, CA (US)

(72) Inventor: Ran Tene, Tel Aviv (IL)

(73) Assignee: DROPBOX, INC., San Francisco, CA (US)

( * ) Notice: Subject to any disclaimer, the term of this patent is extended or adjusted under 35 U.S.C. 154(b) by 206 days.

(21) Appl. No.: 14/961,094

(22) Filed: Dec. 7, 2015

(65) Prior Publication Data
US 2017/0160904 A1   Jun. 8, 2017

(51) Int. Cl.
| | | |
|---|---|---|
| G06F 15/16 | (2006.01) | |
| G06F 3/0484 | (2013.01) | |
| G06F 3/0482 | (2013.01) | |
| H04L 29/08 | (2006.01) | |
| G06F 3/0481 | (2013.01) | |
| H04L 12/58 | (2006.01) | |
| G06F 17/30 | (2006.01) | |
| G06Q 10/10 | (2012.01) | |

(52) U.S. Cl.
CPC ........ *G06F 3/04842* (2013.01); *G06F 3/0482* (2013.01); *G06F 3/04817* (2013.01); *G06F 17/30129* (2013.01); *G06Q 10/107* (2013.01); *H04L 51/063* (2013.01); *H04L 67/06* (2013.01)

(58) Field of Classification Search
CPC ............. G06F 3/04842; G06F 3/04817; G06F 3/0482; G06F 17/30129; G06Q 10/107; H04L 51/063; H04L 67/06
USPC .................................................. 709/217, 206
See application file for complete search history.

(56) References Cited

U.S. PATENT DOCUMENTS

| | | | |
|---|---|---|---|
| 6,859,812 B1 * | 2/2005 | Poynor | ............. G06F 17/30067 |
| 2014/0289868 A1 * | 9/2014 | Byrne | ................. H04L 63/0838 726/28 |
| 2017/0149906 A1 * | 5/2017 | DeMaris | ............... H04L 67/142 |

* cited by examiner

*Primary Examiner* — Wing F Chan
*Assistant Examiner* — Joseph Maniwang
(74) *Attorney, Agent, or Firm* — Keller Jolley Preece

(57) ABSTRACT

A method for sharing one file with many. To share a file, a template sharer selects a file in a shared folder to share as a template file and enters a template share command. In response to the entered command, a template file identifier is encoded and an email message is sent to recipients associated with the shared folder. The email message contains a link encoding the template file identifier. The email messages are sent to the recipients who can then access the link in the email message to retrieve their template instance file. Any modifications to a template instance file are saved. Each template instance file is saved in the collection folder. Thus, the template sharer has access to all of the template instance files.

20 Claims, 11 Drawing Sheets

SHARING A TEMPLATE FILE

TECHNICAL FIELD

The present technology pertains to sharing a template, and more specifically pertains to sharing a template file by distributing a link to one or more recipients and generating a template instance file of the template file for a recipient in response to the recipient accessing the distributed link.

BACKGROUND

Conventional content management systems can allow a user to share a file with others. For example, a user can share a document for collaboration purposes in which each user is able to modify the "same" document. However, in some situations, a user may want to share a document with other users, but not for collaboration purposes. For example, a teacher may want to share a worksheet with each of the students in a class. In a conventional system, the teacher would have to generate a separate folder for each student, add the worksheet to each folder and share each folder with a corresponding student. Such a process can be time consuming.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for enabling a template sharer to share template files with one or more recipients in which each recipient receives a link encoding a template file identifier. In response to a recipient accessing the link, a template instance file is generated for the recipient. Since each recipient receives an instance of the template file, each user can modify their own template instance file independently of others. As a result, a template sharer is able to share copies of a single template file with one or more recipients in an efficient manner. The template sharer is able to access each recipient's template instance file. Each recipient can only access his or her template instance file. Each recipient can modify his or her template instance file.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for sharing one file with many, with each recipient having their own file. To share a file, a template sharer can select a file in a shared folder to share as a template file and enter a template share command, such as a share as a template command. In response to the entered command, a link encoding a template file identifier can be generated. One or more emails messages containing the generated link can be sent to one or more designated recipients. For example, an email message containing the generated link can be sent to all of the recipients associated with the shared folder. In another example, individual email messages containing the generated link can be sent to each recipient associated with the shared folder. The one or more email messages are sent to the one or more recipients who can then access the generated link in the email message to obtain the recipient's template instance file. For example, in response to the link being accessed, a template instance filed for the recipient can be generated. Any modifications to a template instance file are saved. Each template instance file is saved in the shared folder. Thus, the template sharer has access to all of the template instance files in the shared folder.

In one or more alternate embodiments, in response to the entered command to share a template file, a template instance file for each recipient can be generated. Individual email messages can be generated for each recipient with each email message containing the link to a template instance file associated with the recipient. The email messages can be distributed and when a recipient accesses their corresponding link, the recipient can have access to their template instance file. Any modifications to a template instance file are saved. Each template instance file is saved in the shared folder. Thus, the template sharer has access to all of the template instance files in the shared folder.

Figure 1:
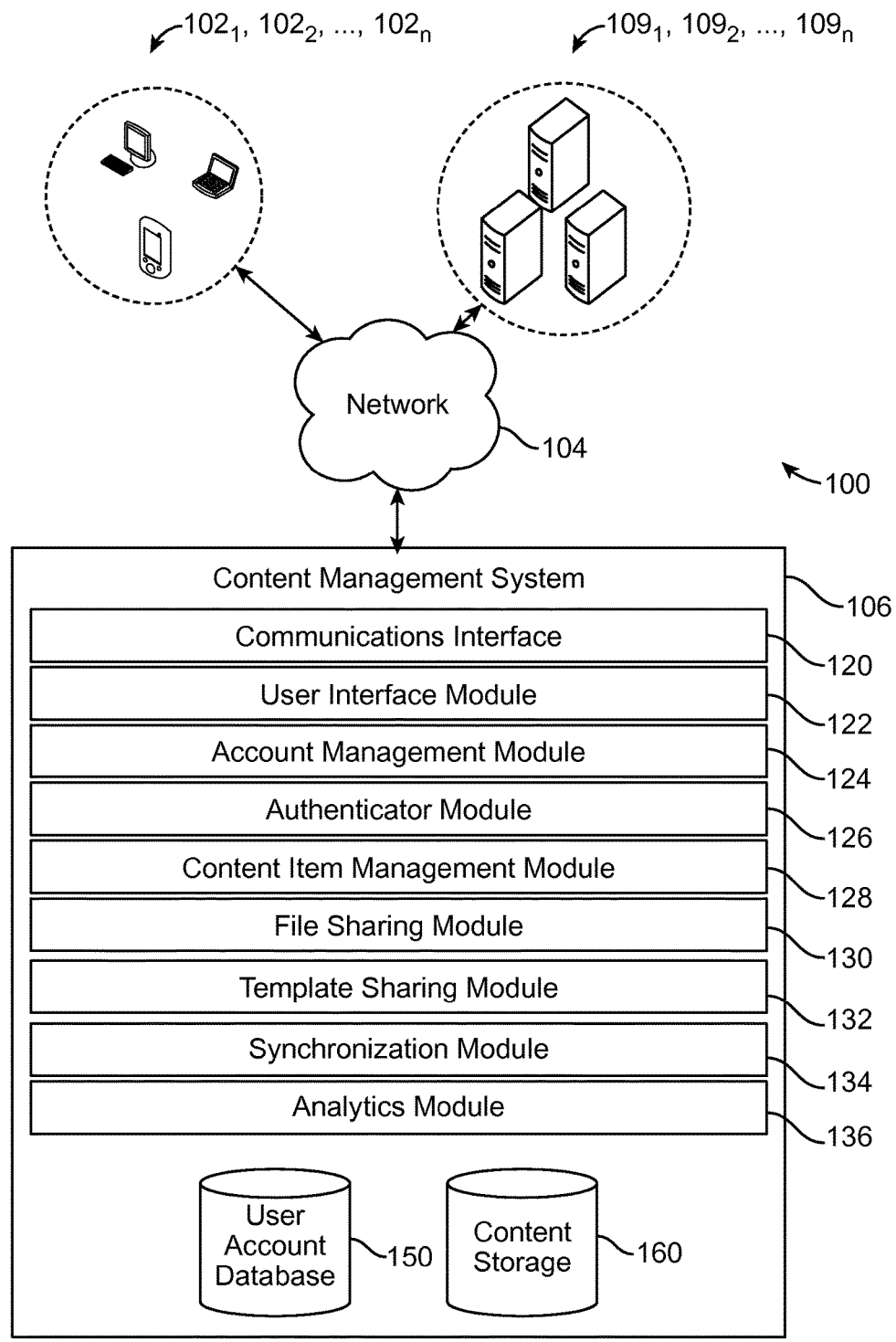
FIG. 1 is block diagram of a configuration of devices and a network in accordance with an exemplary embodiment.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. Each of the shared folders or group folders can include one or more recipients associated with the folder. Each of the shared folders or group folders can include an email address for each of the associated recipients. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device 102$_i$ can include client software, which synchronizes, via synchronization module 134 at content management system 106, content in client device 102$_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include communications interface 120 for interfacing with various client devices 102, and can interact with other content and/or service providers 109$_1$, 109$_2$, ..., 109$_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Content management system 106 can include a content item management module 128 which stores the content items in the content storage 160. The content item management module 128 can include a content directory for identifying the location of each content item stored in content storage 160. The content management system 106 can include a template sharing module 132 which enables a template sharer to share a file, such as a template file, with one or more recipients. For example, each recipient can receive an email message containing a link encoding a template file identifier and a template instance file can be created in response to the link being acted upon. Alternatively, each recipient can receive a link to a template instance file. When either of the links is acted upon, each recipient is able to access and modify their own template instance file. Further, content management system 106 can include analytics module 136 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102$_i$ of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage. A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

Figure 2:
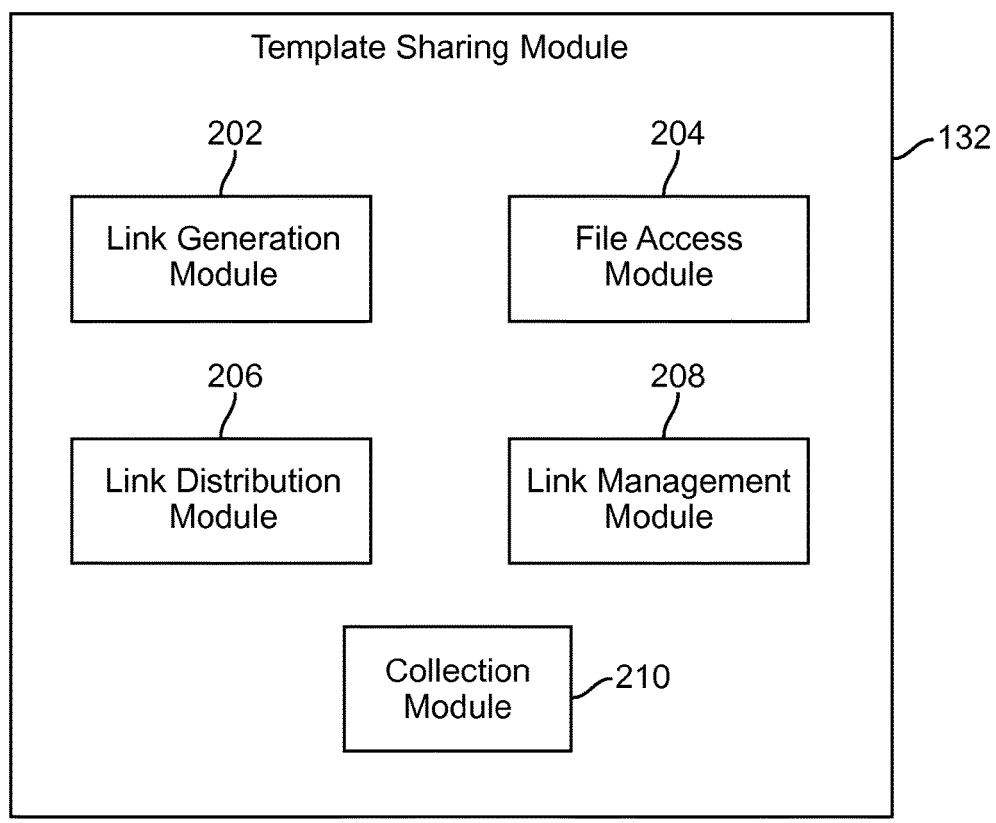
FIG. 2 is a block diagram of a template sharing module in accordance with an exemplary embodiment.

Referring to FIG. 2, a block diagram illustrating the components of a template sharing module 132 in accordance with an exemplary embodiment is illustrated. The template sharing module 132 enables a template sharer to share a file, such as a template file, with one or more recipients in which each recipient receives a link. The link can encode a template file identifier identifying the template file or to a template instance file stored in the shared folder. The shared folder can store the template instance files for the recipients and allows each recipient to modify their own template instance file. As a result, a template sharer is able to share a single template file with one or more recipients with the template sharer having access to each recipients template instance file. As shown, the template sharing module 132 can include a link generation module 202, a file access module 204, a link distribution module 206, a link management module 208 and a collection database 210. The link generation module 202 can generate a link encoding a template file identifier (e.g., a template file link) or to a template instance file (e.g., a template file instance link) stored in the shared folder. The link distribution module 204 can distribute the generated link encoding the template file identifier or can distribute the generated links to the instance template files, to the corresponding recipients. The link management module 206 allows a template sharer to access the template file and each of the template instance files. The link management module 206 allows a recipient to have access only to the recipient's template instance file. The collection database 208 can maintain information about the template file and each template instance file and related information such as whether a shared folder is activated or deactivated.

Link generation module 202 is configured to generate a template file link and/or template instance file links. In one or more embodiments, upon receiving a share as a template command, the link generation module 202 generates a template instance file, for each designated recipient associated with the shared folder. A unique file set descriptor for the template file or for the template instance file set, and a unique file location path or URL that serves as the link. The template sharing module 132 saves an association of the file set descriptor and the file location path or URL to collection database 210. In some embodiments, the generated link or the template instance file link is independent of the file set descriptor so that the file set descriptor cannot be inferred from the template file link or the template instance file link, and vice versa. An independent file set descriptor and file location path or URL prevents malfeasance by making it essentially impossible to guess or reverse engineer a sharable link if it is not already known. As an example, when sharing a folder "Reunion" with a file id of 3D8B99, link generation module 202 might generate a unique (e.g., one-way pad, or a pseudo-random value) URL such as https://www.service.com/s/28rtiz608u2mnco/BBQ.pdf, where the URL component 28rtiz608u2mnco cannot be reverse-engineered, and accordingly create an entry <3D8B99, https://www.service.com/s/28rtiz608u2mnco/BBQ.pdf> in collection database 210. In one embodiment, the generated link can further be shortened. In some embodiments, the generated URL https://www.service.com/s/28rtiz608u2mnco/BBQ.pdf can further be shortened using a link-shortening service to a shorter URL (e.g., http://db.tt/xOFounw), and an additional association between the original link and the shortened link can be added to collection database 210. In another embodiment, the file set can be directly associated with the shortened link rather than with an intermediate, longer generated link.

In other embodiments, a template sharer can generate multiple different links to the same shared folder or shared folders. For example, the same shared folder can be used for different template files. In other embodiments, a template sharer can deactivate a shared folder or shared folders. By deactivating a shared folder or shared folders, recipients can no longer upload a file to the shared folder or shared folders. In addition, recipients are prohibited access to the shared folder or shared folders that are designated as deactivated. Moreover, since a shared folder link is versatile, in some embodiments, the system may include reference to a particular relevant application, or applications, in a link by embedding an application identifier in the generated link. As an example, the generated link for a given shared folder could be the URL https://www.service.com?app=1ps3q/s/28rtiz608u2mnco/BBQ.pdf, which specifies (via the portion "app=1ps3q") that some application uniquely associated with the identifier "1ps3q" (e.g., Microsoft Word or Microsoft Visio) should be used to view a file in the shared folder. Alternatively, the association between the link and the application or application plug-in can be made as an entry in collection database 210, rather than by including an application identifier in the link. For example, in various embodiments, a template sharer may generate a first link to a shared folder that specifies use of a first application for viewing a file in the shared folder, and a second link that specifies use of a second application for viewing a file in the shared folder. In this example, the collection database 210 would in turn contain two corresponding entries: i.e., <collection file identifier, first link identifier, first application identifier> and <collection file identifier, second link identifier, second application identifier>. In another embodiment, the link management module 208 may be configured to select the proper applications or application plug-ins to use in the file browser, e.g., based on the types of files in the shared folder. The link management module 208 may also allow template sharers to specify which application should open a particular file or set of files when the files are accessed via a particular link.

To share a content item privately, the template sharing module 132 can be configured to add a user account identifier to the content entry associated with the content item, thus granting the added user account access to the content item. The template sharing module 132 can also be configured to remove user account identifiers from a content entry to restrict a user account's access to the content item. In one or more embodiments, the template sharer can limit the sharing of a content item in one or more ways. For example, the template sharer can limit sharing with recipients that are: members of an enterprise, recipients who have an account with the content management system 106, recipients who have an access password and/or based on an expiration date. An enterprise member is a member who has a user account that is associated with an enterprise account, such as a Dropbox for Business account. Sharing can be limited to only recipients who have an account with the content management system 106 and prohibit users who do not have an account with the content management system 106. Sharing can be limited to recipients who enter a password associated with the template file. For example, a template sharer can provide each recipient with a password in person and/or can send an email message containing the password to one or more recipients. Sharing can be limited based on an expiration date. The expiration date can be set by the template sharer or can be a default expiration date set by the content management system 106.

To share content publicly, template sharing module 132 can be configured to generate a custom network address, such as a uniform resource locator (URL), which allows any web browser to access the content in content management system 106 without any authentication. To accomplish this, the template sharing module 132 can be configured to include content identification data in the generated URL, which can later be used to properly identify and return the requested content item. For example, the template sharing module 132 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, template sharing module 132 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. The template sharing module 132 can be configured to change the value of the flag to 1 or true after generating a URL to the content item.

In some embodiments, the template sharing module 132 can also be configured to deactivate a generated URL. For example, each content entry can also include a URL active flag indicating whether the content should be returned in response to a request from the generated URL. For example, the template sharing module 132 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL Likewise, the template sharing module 132 can reactivate the URL by again changing the value of the URL active flag to 1 or true. A user can thus easily restore access to the content item without the need to generate a new URL.

To share a content item as a template file, template module 132 can be configured to save the template file and each template instance file. The template file and the template instance file can be stored in the content storage 160. In one or more embodiments, the template file is stored in a first database of the collection database 210 and each template instance file is stored in a second database of the collection database 210. Alternatively, the template file and each template instance file is stored in the same database, e.g., collection database 210. In one or more embodiments, each template instance file can be stored in a shared folder. A shared folder can be a folder that allows the template sharer to access the template instance files. The shared folder can also provide an indication to identify whether the template instance files were modified.

The template file can include template metadata. The template metadata can include a file identifier, a template name, an owner identifier and a template file identifier. The file identifier, e.g., a file id, can be a unique identifier assigned to the template file. The template name, e.g., a template file name, can be a format for naming each of the template instance files. The owner identifier, e.g., ownerid, can be an identifier that identifies the owner or creator of the template file. The template file identifier, e.g., fileId, can be a unique template file identifier that identifies the template file.

For each template instance file, the template instance file can include template instance metadata. The template metadata can include a template identifier, a user identifier and a template file identifier. The template identifier, e.g., a template id, can be a unique identifier assigned to the template instance file. The user identifier, e.g., userId, can be a unique identifier identifying the user associated with the template instance file. The template file identifier, e.g., template fileId, can be a unique identifier assigned to the template instance file after the template instance file has been modified.

To share a template file, the template sharing module 132 can be configured to generate a custom network address for a shared folder or for each template instance file, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, template sharing module 132 can be configured to include a user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, template sharing module 132 can also be configured to record that a URL to the shared folder and/or to the content item that has been created for each template instance file. In some embodiments, the content entry associated with a content item can include a URL flag indicating whether a URL to the shared folder and/or to the content item has been created. For example, the URL flag can be a Boolean value initially set to 0 or false to indicate that a URL to the shared folder and/or content item has not been created. Template sharing module 132 can be configured to change the value of the flag to 1 or true after generating a URL to the shared folder and/or content item.

In some embodiments, template sharing module 132 can also be configured to deactivate a generated URL. For example, each shared folder and/or template instance file can also include a URL active flag indicating whether the template instance file should be returned in response to a request from the generated URL. For example, template sharing module 132 can be configured to only return a template instance file requested by a generated link if the URL active flag is set to 1 or true. Thus, access to a template instance file for which a URL has been generated can be easily restricted by changing the value of the URL active flag. This allows a template sharer to restrict access to the shared folder and/or template instance files without having to move the shared folder and/or template instance file, or delete the generated URL. Likewise, template sharing module 132 can reactivate the URL by again changing the value of the URL active flag to 1 or true. A template sharer can thus easily restore access to the shared folder and/or content instance file without the need to generate a new URL.

Example User Experience

Figure 3A:
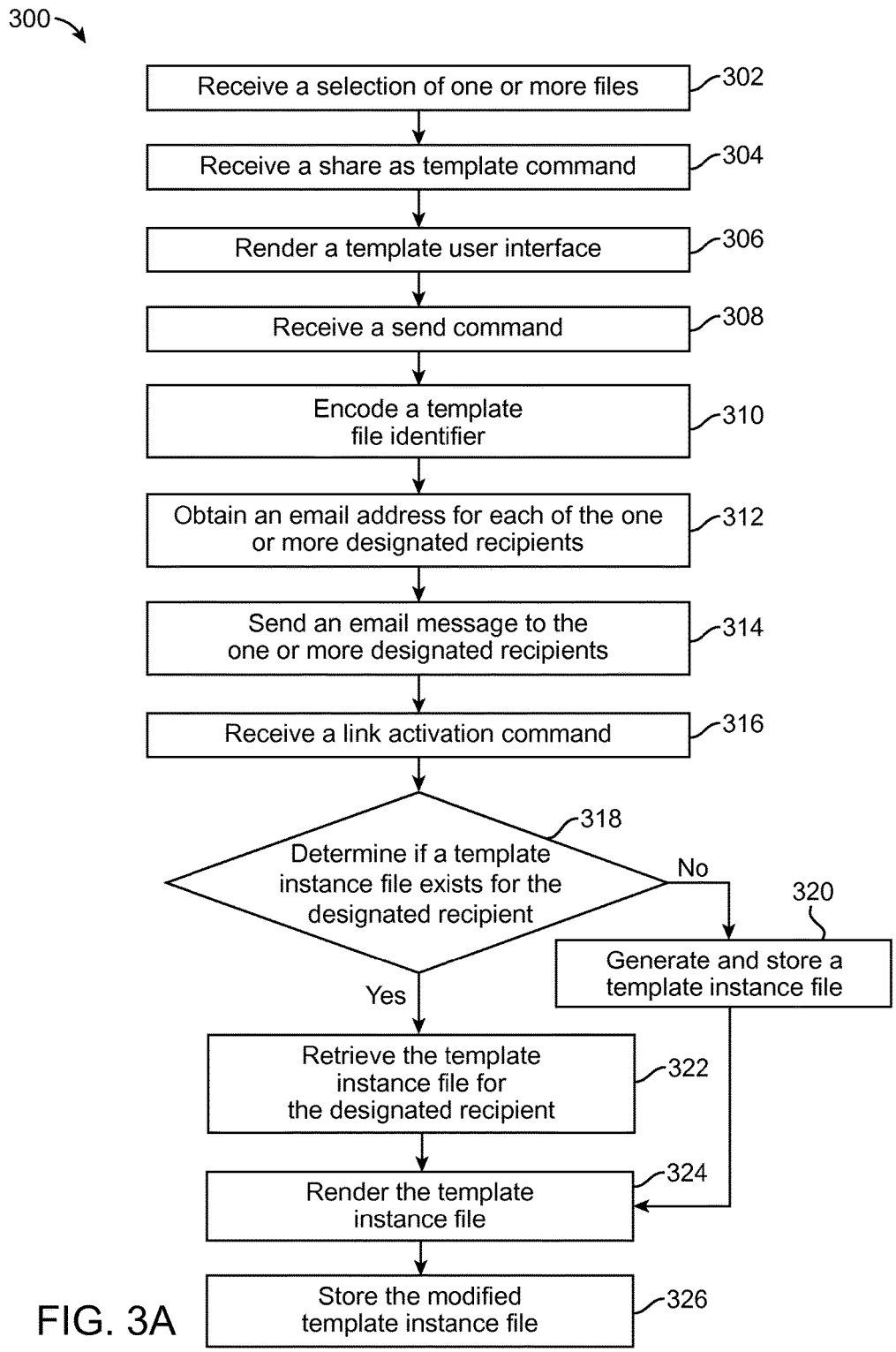
FIG. 3A is a flow diagram of a method for sharing a template file in accordance with a first exemplary embodiment.

Referring to FIG. 3A, a flow diagram for sharing a template in accordance with a first exemplary embodiment is illustrated. The exemplary method 300 is provided by way of example, as there are a variety of ways to carry out the method. The method 300 described below can be carried out using the configurations illustrated in FIG. 1 by way of example, and various elements of this figure are referenced in explaining exemplary method 300. Each block shown in FIG. 3A represents one or more processes, methods or subroutines, carried out in the exemplary method 300. The exemplary method 300 is described with respect to an application operating on a client device 102. However, one of ordinary skill in the art would recognize that the method 300 can be performed via a browser on a client device 102 as known in the art. The exemplary method 300 can begin at block 302.

Figure 4:
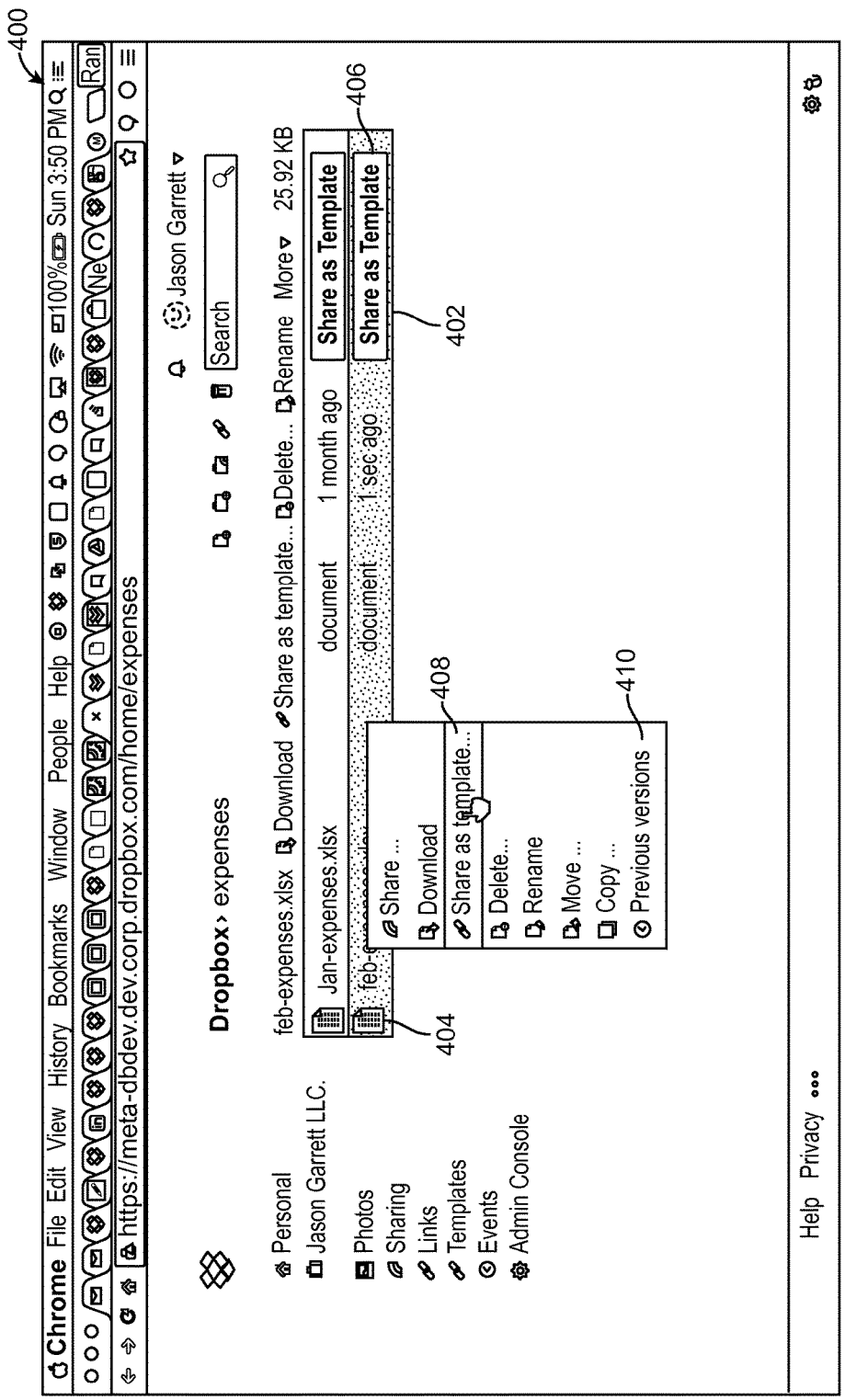
FIG. 4 is a user interface (UI) allowing a template sharer to share a template file with recipients in accordance with an exemplary embodiment.

At block 302, receive a selection of one or more files. For example, the content management system 106 and/or the template sharing module 132 receives a selection of one or more files. The one or more files can be in a shared folder or a non-shared folder. In an exemplary embodiment, as shown in FIG. 4, a user interface (UI) 400, displayed on a client device $102_i$, allows a template sharer to select a file from a list of displayed files. As shown, the "feb-expenses.xlsx" file 404 is selected from the list of files displayed in the UI 400. Alternatively, the template sharer can select a folder of files or one or more files as known in the art. After receiving a selection of one or more files is received, the method 300 can proceed to block.

At block 304, receive a share as template command. For example, the content management system 106 and/or the template sharing module 132 receives a selection of a share as template command. The command can be received in response to a template sharer selecting a displayed button, such as, a "Share as Template" button 406 displayed alongside each displayed file as shown in FIG. 4. Alternatively, the template sharer can select a menu option, such as, a "Share as template" 408 menu option, from a list of menu options listed in a displayed menu 410. The menu 410 can be displayed as known in the art. For example, the menu 410 can be displayed in response to a template sharer right clicking on the selected file. The menu 410 can include a template sharing option, such as a "Share as template" menu option 408. After receiving a share as template command is received, the method 300 can proceed to block 306.

At block 306, render a template UI. For example, the content management system 106 and/or the template sharing module 132 causes a template UI to be rendered on a client device 102, in response to receiving the template command.

Figure 5:
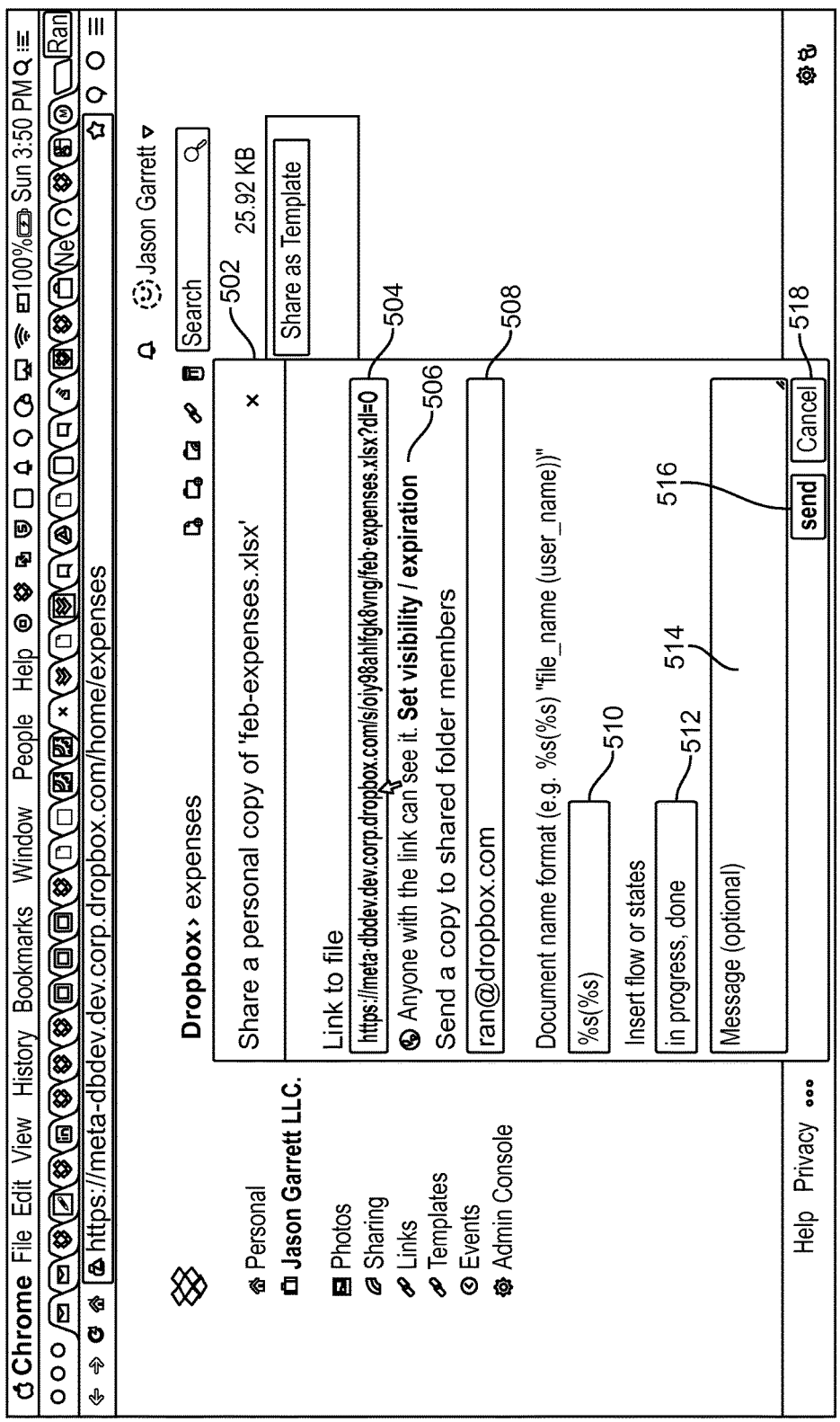
FIG. 5 is a template UI in accordance with an exemplary embodiment.

In an exemplary embodiment, as shown in FIG. 5, a template UI 502, displayed on a client device $102_i$, allows a template sharer to enter parameters or information to create template instance files. The template UI 502 can include, but is not limited to, a link to the shared folder or template file 504, a visibility/expiration menu option 506, a recipient box 508, a filename box 510, a flow state box 512, a message box 514, a send button 516 and a close button 518. The link to the shared folder or template file 504 can include the file path to the shared folder or template file. The visibility/ expiration menu option 506 allows a template sharer to determine who has access to the shared folder and/or template instance files and/or an amount of time a recipient of a template instance file can modify the template instance file. For example, the visibility/expiration menu option 506 can include: anyone with the link can see the file, only recipients who log into the content management system can see the file, only recipients who are members of an enterprise, only recipients who enter a password associated with the template file, an access deadline which prevents recipients accessing their template instance file after the deadline, and a grace period deadline which allows recipients to complete their template instance file after the deadline. Any files submitted during the grace period can be stored in a separate folder, such as a "Late Uploads" folder. Once the expiration deadline or grace period deadline is reached, the associated URLs can be deactivated for the recipients.

The recipient box 508 allows a template sharer to enter additional recipients who can receive a template instance file. For example, the template sharer can enter an email address of an additional recipient. As explained below, the recipients or designated recipients are the users who are associated with the shared folder that the template file is stored in. In the event the folder is not a shared folder or if the template sharer wants to add additional recipients, the template sharer can enter one or more email addresses in the recipient box 508 which causes an email containing a link encoding a template file identifier to be sent to each of the entered email addresses.

The filename box 510 allows a user to modify the template file name that each recipient receives. In one or more embodiments, the default file name comprises the filename of the template file and the user name with the user name being concatenated to the filename of the template file. For example, if the template file name is "feb-expenses.xlsx" and a recipient's name is Bob Smith, the corresponding template instance file name would be "feb-expenses-Bob-Smith.xlsx." In one or more embodiments, a template sharer can supplement the name of the file by adding a file name in the filename box 510.

The flow state box 512 allows a template sharer to select status identifiers. For example, the status identifiers can include in progress, done and cancelled. "In progress" refers to a template that has not been completed. "Done" refers to a template that has been completed. "Cancelled" refers to a template that is expired, e.g., the recipient can no longer modify. In one or more embodiments, in progress and done are the default status identifiers. If a template sharer accesses the shared folder associated with the template instance file, the shared folder can include a status identifier for each template instance file. The status identifier can provide a status for the associated instance template file.

The message box 514 allows a template sharer to enter a message that is distributed in an email message, along with the link to each of the one or more designated recipients. The send button 516 allows a template sharer to share the template with one or more designated recipients. The cancelled button 518 allows a template sharer to cancel an intended request to share a template file.

Figure 6:
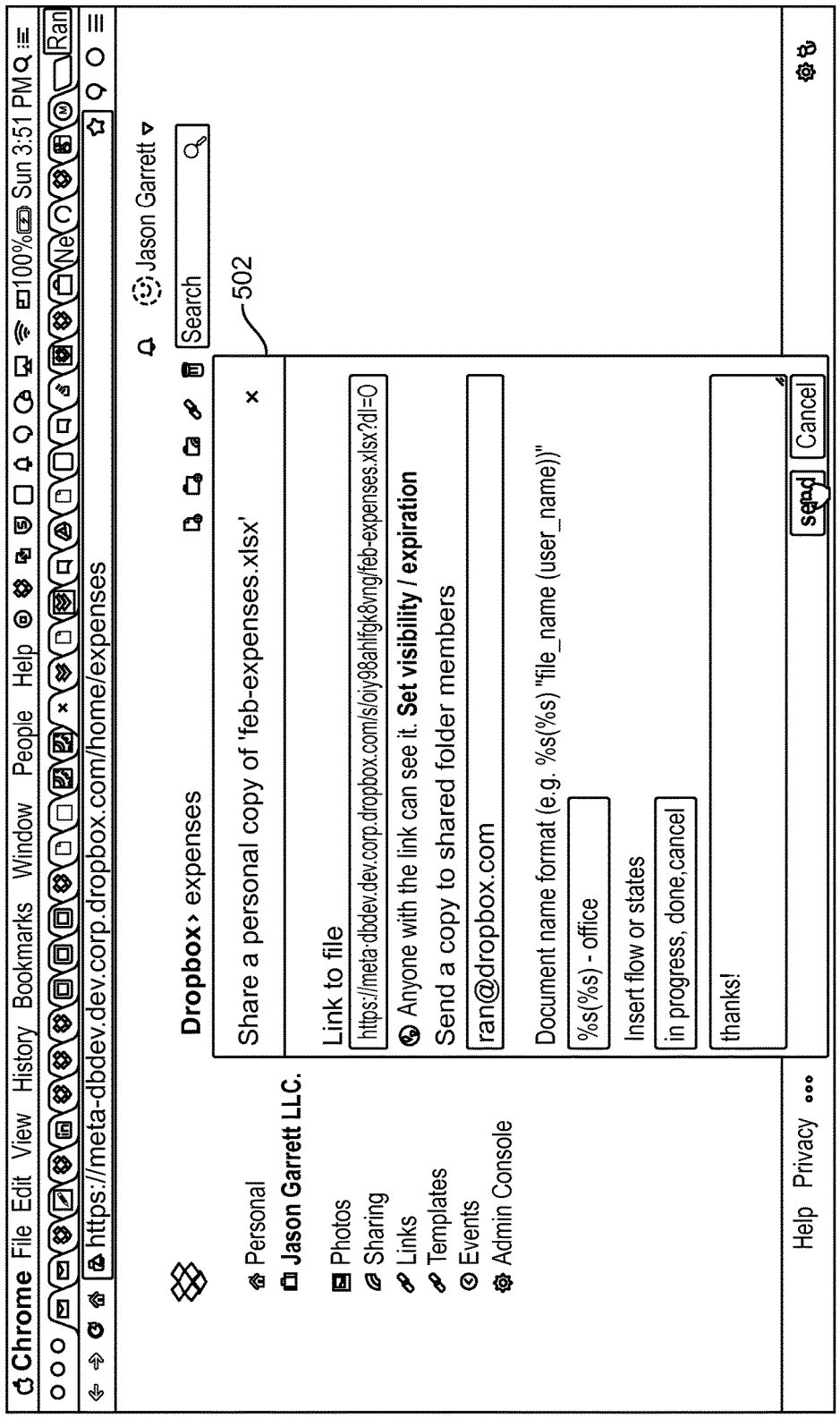
FIG. 6 is a completed template UI in accordance with an exemplary embodiment.

Referring to FIG. 3A again, after a template UI is rendered, the method 300 can proceed to block 308. At block 308, receive a send command. For example, the content management system 106 and/or the template sharing module 132 receives a send command in response to the file sharer selecting the send button 514. In an exemplary embodiment, as shown in FIG. 6, a completed template UI 502, displayed on a client device $102_i$. As shown, a template sharer supplemented the status identifiers to include a "canceled" status identifier and supplemented the file name with "-office" and added a message of "Thanks". After receiving the send command, the method 300 can proceed to block 310.

At block 310, encode a template file identifier. For example, the content management system 106 and/or the template sharing module 132 encodes a template file identifier identifying the template file as a link in response to receiving the send command. The content management system 106 and/or the template sharing module 132 can store the template file in the shared folder. After encoding the template file identifier, the method 300 can proceed to block 312.

At block 312, obtain an email address for each of the one or more designated recipients. For example, the content management system 106 and/or the template sharing module 132 obtains an email address for each of the one or more designated recipients. The email addresses can be based on the recipients associated with the shared folder and/or the email addresses that are entered in the recipient box 508.

After obtaining an email address for each of the designated recipients, the method 300 can proceed to block 314

Figure 8:
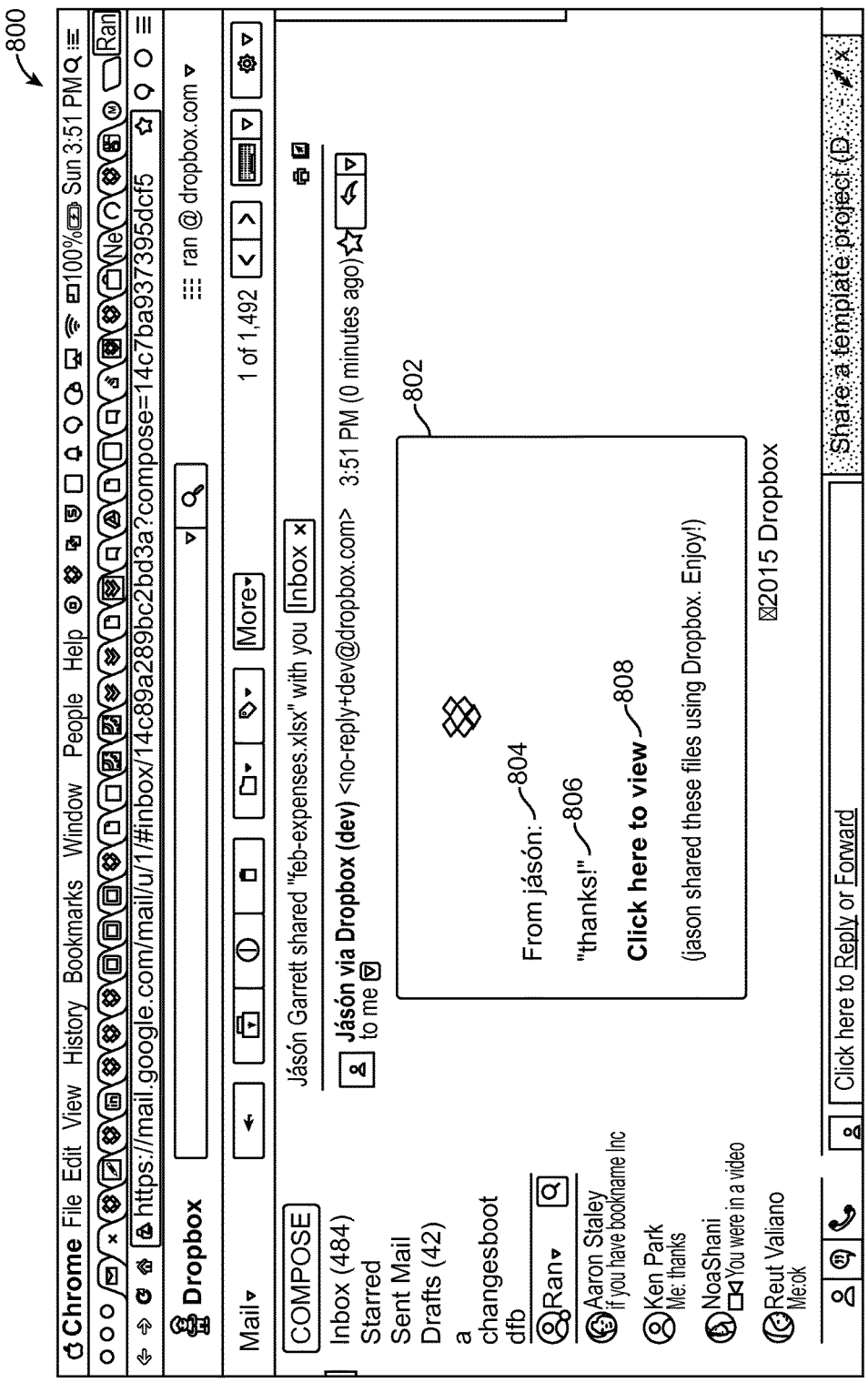
FIG. 8 is a message UI for accessing a shared template instance file in accordance with an exemplary embodiment.

At block 314, send an email message to the one or more designated recipients. For example, the content management system 106 and/or the template sharing module 132 sends an email message containing a link for the encoded template file identifier. For example, one email message can be sent to all of the recipients or individual email messages can be sent to each recipient. The email message(s) can include a message from the template sharer if the template sharer entered a message in the message box 512. Referring to FIG. 8, a UI displaying an email message is illustrated. As shown, the UI 800 is displaying an email message 802 which identifies the template sharer 804, Jason, the message 806, "thanks!", and a link encoding the template file identifier stored in the shared folder 808. After sending an email message to the one or more designated recipients, the method 300 can proceed to block 316.

At block 316, receive a link activation command. For example, the content management system 106 receives a link activation command in response to a designated recipient selecting the link to the shared folder. The link activation command can include a session id and can trigger an Application Program Interface (API), such as a template sharing API. Referring to FIG. 8 again, the recipient clicks on the link 808 to the shared folder. After receiving the link activation command, the method 300 can proceed to block 318.

At block 318, determine if a template instance file exists for the designated recipient. For example, the content management system 106 and/or the template sharing module 132 determines if a template instance file exists for the recipient who caused the link activation command to be sent. In one or more embodiments, this can be done by extracting a user id from a session id associated with the recipient's accessing the link to and determining if a template instance file was created for the user. For example, if a template instance file was created, the template instance file would include a user id associated with the user. If a template instance file does not exist for the recipient, the method 300 proceeds to block 320. If a template instance file exists for the recipient, the method 300 proceeds to block 322.

Figure 7:
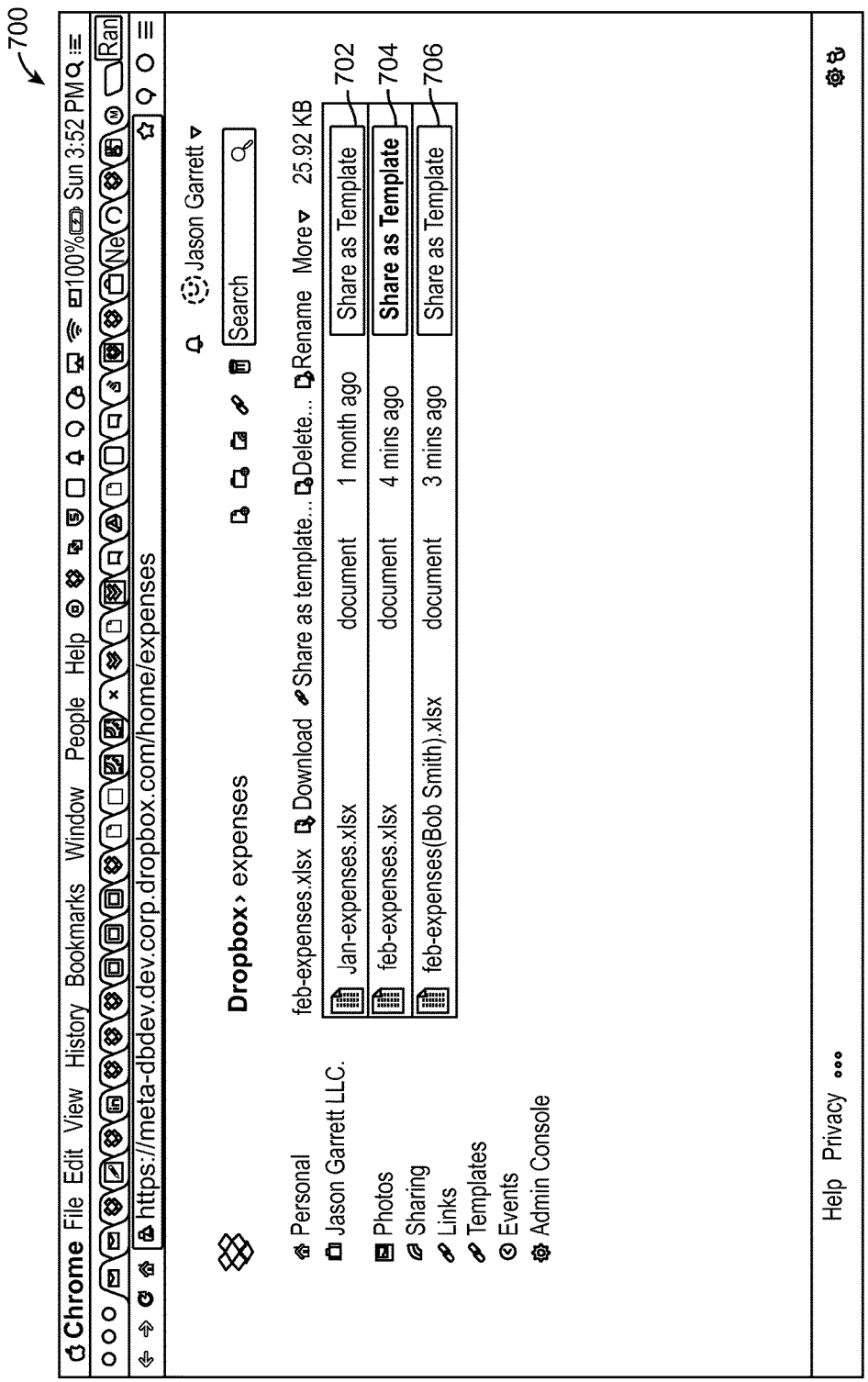
FIG. 7 is a UI rendering a list of files in a shared folder in accordance with an exemplary embodiment.

At block 320, generate and store a template instance file for the recipient. For example, the content management system 106 and/or the template sharing module 132 generates a template instance file for the recipient who accessed the link. The template instance file is stored in the shared folder. The file name for each stored template instance file includes the template filename and the recipient's name. FIG. 7 shows a UI 700 of the files in a shared folder for a template sharer. In this example, the template sharer is Jason Garrett, who has three files: a file named "jan-expenses.xlsx" 702, a template file named "feb-expenses.xlsx" 704 and a template instance file named "feb-expenses(Bob Smith)-office.xlsx" 706 in his folder. After generating and storing the template instance file, the method 300 can proceed to block 324.

At block 322, retrieve the template instance file for the designated recipient. For example, the content management system 106 and/or the template sharing module retrieves the previously generated template instance file for the designated recipient. This can be done using the extracted user id. After retrieving the template instance file, the method 300 can proceed to block 324.

At block 324, render the template instance file in response to receiving the link activation command. For example, the content management system 106 causes the template instance file to be rendered on the client device $102_i$. The rendered template instance file can be the template instance file that was generated at block 320 or the template instance file that was retrieved at block 322. In one or more embodiments, a recipient can be authenticated prior to rendering the template instance file as shown in FIG. 3C and discussed below. After rendering the template instance file, the method 300 can proceed to block 326.

At block 326, store the modified template instance file. For example, the recipient modifies the template instance file and the content management system 106 saves the modified file in the shared folder. The modified template instance file can be stored in response to the recipient entering a save command and/or if the recipient exits out of the template instance file. Thus, the designated recipient is able to fill out or modify the template instance file and have the changes saved in the shared folder.

Figure 3B:
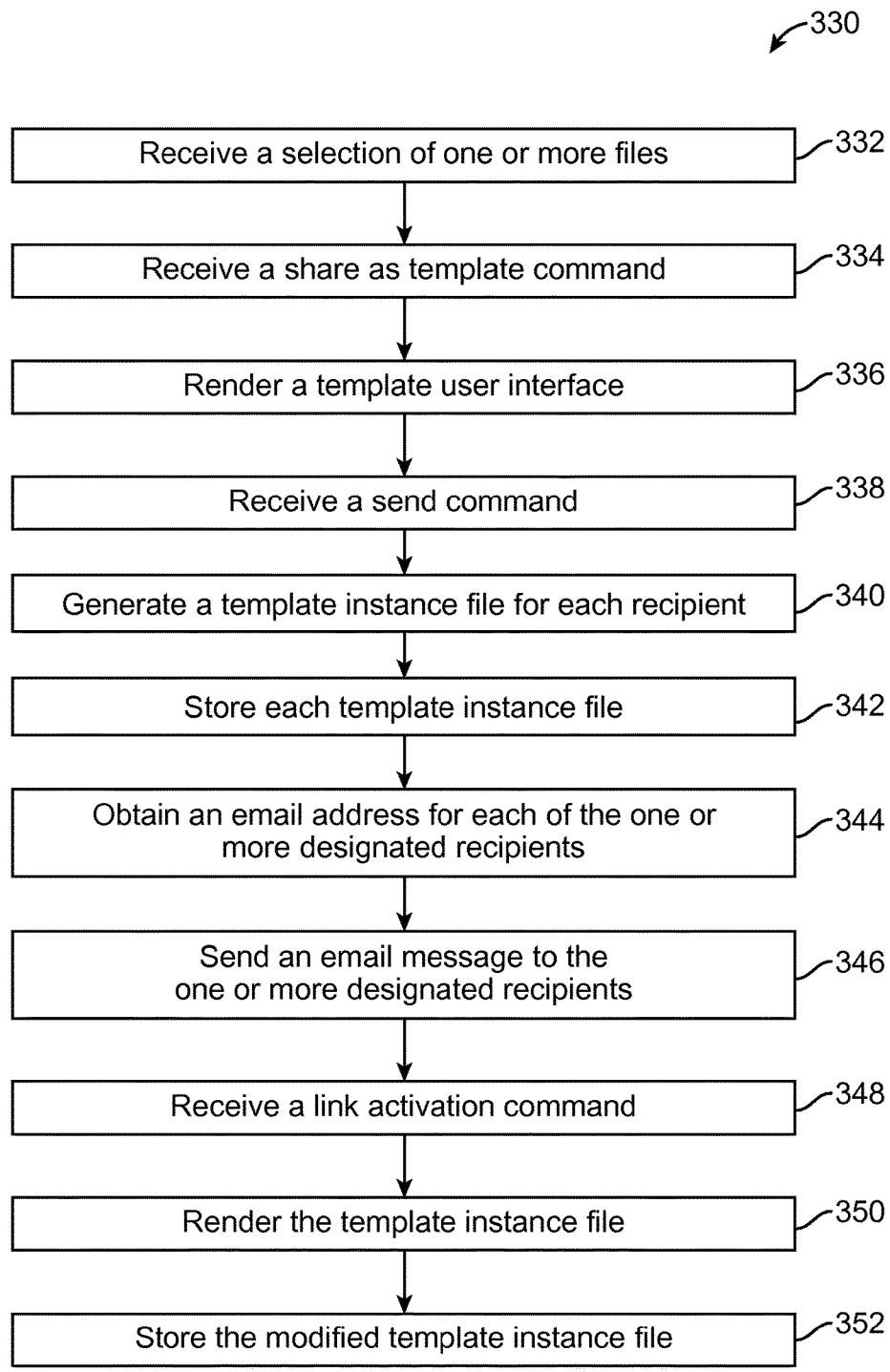
FIG. 3B is a flow diagram of a method for sharing a template file in accordance with a second exemplary embodiment.
Figure 3C:
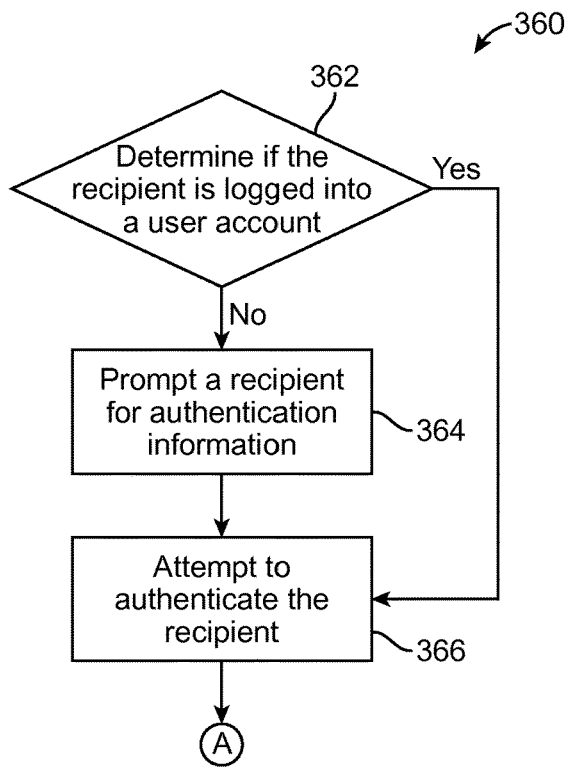
FIG. 3C is a flow diagram for block 316 of FIG. 3A and block 348 in FIG. 3B in accordance with an exemplary embodiment.

Referring to FIG. 3B, a flow diagram for sharing a template in accordance with a second exemplary embodiment is illustrated. The exemplary method 330 is provided by way of example, as there are a variety of ways to carry out the method. The method 330 described below can be carried out using the configurations illustrated in FIG. 1 by way of example, and various elements of this figure are referenced in explaining exemplary method 330. Each block shown in FIG. 3B represents one or more processes, methods or subroutines, carried out in the exemplary method 330. The exemplary method 300 is described with respect to an application operating on a client device 102. However, one of ordinary skill in the art would recognize that the method 300 can be performed via a browser on a client device 102 as known in the art. The exemplary method 300 can begin at block 332.

At block 332, receive a selection of one or more files. For example, the content management system 106 and/or the template sharing module 132 receives a selection of one or more files. The one or more files can be in a shared folder or a non-shared folder. In an exemplary embodiment, as shown in FIG. 4, a user interface (UI) 400, displayed on a client device $102_i$, allows a template sharer to select a file from a list of displayed files. As shown, the "feb-expenses.xlsx" file 404 is selected from the list of files displayed in the UI 400. Alternatively, the template sharer can select a folder of files or one or more files as known in the art. After receiving a selection of one or more files is received, the method 330 can proceed to block 334.

At block 334, receive a share as template command. For example, the content management system 106 and/or the template sharing module 132 receives a selection of a share as template command. The command can be received in response to a template sharer selecting a displayed button, such as, a "Share as Template" button 406 displayed alongside each displayed file as shown in FIG. 4. Alternatively, the template sharer can select a menu option, such as, a "Share as template" 408 menu option, from a list of menu options listed in a displayed menu 410. The menu 410 can be displayed as known in the art. For example, the menu 410 can be displayed in response to a template sharer right clicking on the selected file. The menu 410 can include a template sharing option, such as a "Share as template" menu option 408. As described earlier, FIG. 5 shows a template UI 502. After receiving a share as template command is received, the method 330 can proceed to block 336.

At block 336, render a template UI. For example, the content management system 106 and/or the template sharing module 132 causes a template UI to be rendered on a client device $102_i$ in response to receiving the template command.

As discussed above with respect to FIG. 5, a template UI 502, displayed on a client device 102$_i$, allows a template sharer to enter parameters to create template instance files. After rendering a template UI, the method 330 can proceed to block 338.

At block 338, receive a send command. For example, the content management system 106 and/or the template sharing module 132 receives a send command in response to the template sharer selecting the send button 514. As discussed above with respect to FIG. 6, a completed template UI 502 is displayed on a client device 102$_i$. After receiving the send command, the method 330 can proceed to block 340.

At block 340, generate a template instance file for each recipient. For example, the content management system 106 and/or the template sharing module 132 generates a template instance file of the template file for each recipient in response to receiving the send command. The recipients are the users associated with the shared folder that the selected file is selected from. After generating a template instance file, the method 330 can proceed to block 342.

At block 342, store each template instance file. For example, the content management system 106 and/or the template sharing module 132 stores each template instance file along with the template file in the shared folder. The file name for each stored template instance file includes the template filename and the recipient's name. FIG. 7 shows a UI 700 of the files in a shared folder for a template sharer. After storing the files, the method 330 can proceed to block 344.

At block 344, obtain an email address for each of the one or more designated recipients. For example, the content management system 106 and/or the template sharing module 132 obtains an email address for each of the one or more designated recipients. The email addresses can be based on the recipients associated with the shared folder and/or the email addresses that are entered in the recipient box 508. After obtaining an email address for each of the designated recipients, the method 330 can proceed to block 346.

At block 346, send an email message to the one or more designated recipients. For example, the content management system 106 and/or the template sharing module 132 sends an email message including a link to the generated template instance file. For example, an individual email message is sent to each recipient. The email message can include a message from the template sharer if the template sharer entered a message in the message box 512. Referring to FIG. 8, a UI displaying an email message is illustrated. As shown, the UI 800 is displaying an email message 802 which identifies the template sharer 804, Jason, the message 806, "thanks!", and a link to the template instance file 808. After sending an email message to the one or more designated recipients, the method 330 can proceed to block 348.

At block 348, receive a link activation command. For example, the content management system 106 receives a link activation command in response to a designated recipient selecting the link to the template instance file. Referring to FIG. 8 again, the recipient clicks on the link 808 to the template instance file. After receiving the link activation, the method 330 can proceed to block 350.

At block 350, render the template instance file in response to receiving the link activation command. For example, the content management system 106 causes the template instance file to be rendered on the client device 102$_i$. After rendering the template instance file, the method 330 can proceed to block 352.

At block 352, store the modify template instance file. For example, the recipient modifies the template instance file and the content management system 106 stores the modified file in the shared folder. The modified template instance file can be stored in response to the recipient entering a save command and/or if the recipient exits out of the template instance file. Thus, the designated recipient is able to fill out or modify the template instance file and have the changes saved in the shared folder.

In one or more embodiments, a recipient can be authenticated prior to rendering the template instance. Referring to FIG. 3C, a detailed flow diagram for block 316 of FIG. 3A and block 348 of FIG. 3B in accordance with an exemplary embodiment is illustrated. The exemplary method 360 is provided by way of example, as there are a variety of ways to carry out the method. The method 360 described below can be carried out using the configurations illustrated in FIG. 1 by way of example, and various elements of this figure are referenced in explaining exemplary method 360. Each block shown in FIG. 3C represents one or more processes, methods or subroutines, carried out in the exemplary method 360. The exemplary method 360 is described with respect to an application operating on a client device 102$_i$. However, one of ordinary skill in the art would recognize that the method 360 can be performed via a browser on a client device 102, as known in the art. The exemplary method 360 can begin at block 362.

At block 362, determine if the recipient is logged into a user account. For example, the authenticator module 126 determines if the recipient is logged into a user account. If the recipient is not logged into a user account, the method 360 can proceed to block 364. If the recipient is logged into a user account, the method 360 can proceed to block 366. If the recipient's client device 102$_i$ contains a login cookie, the method 360 can proceed to block 366.

At block 364, prompt a recipient for authentication information. For example, the authenticator module 126 can cause the rendering of an authentication UI on the recipient's client device 102$_i$. The authentication UI can prompt the recipient to enter login information in order to have the recipient log into the recipient's user account. For example, the recipient can be prompted to enter a username and a password. In another example, the recipient can be prompted to enter a password associated with the template file. In response to the recipient entering the authentication information, the method 360 can proceed to block 366.

At block 366, attempt to authenticate the recipient. For example, the authenticator module 124 can use the authentication information to authenticate the recipient and determine if the recipient is associated with the template file and/or associated with an enterprise. The authentication information can be the entered authentication information in response to the prompts, such as, a user name and password, or a password. Alternatively, the authentication information can be obtained from the login cookie stored on the recipient's client device 102$_i$. If the recipient is authenticated, the method 360 can proceed to block 318 of FIG. 3A or to block 348 of FIG. 3B. If the recipient is not authenticated, the method 360 can proceed to block 364.

Figure 3D:
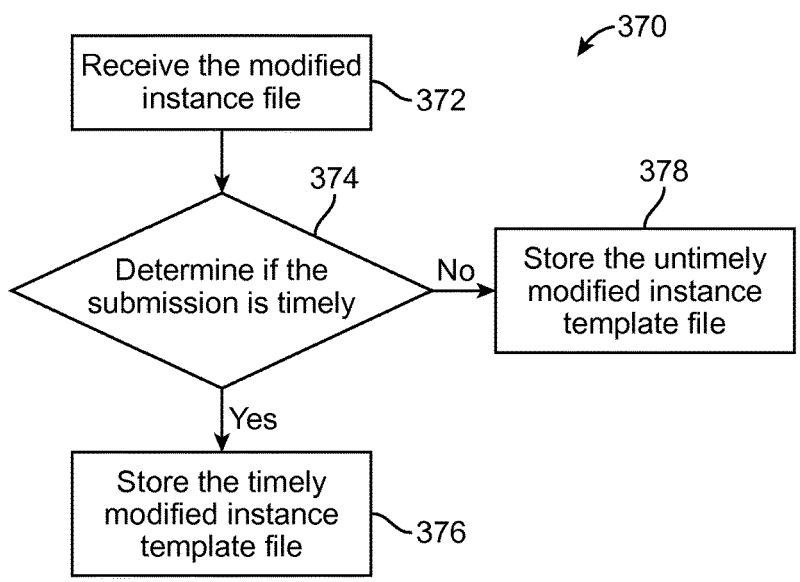
FIG. 3D is a flow diagram for block 326 of FIG. 3A and block 352 of FIG. 3B in accordance with an exemplary embodiment.

In one or more embodiments, a modified template instance file can be saved in a separate folder if the modification occurs after a set deadline. Referring to FIG. 3D, a detailed flow diagram for blocks 326 and 352 in accordance with an exemplary embodiment is illustrated. The exemplary method 370 is provided by way of example, as there are a variety of ways to carry out the method. The method 370 described below can be carried out using the configurations illustrated in FIG. 1 by way of example, and various elements of this figure are referenced in explaining exemplary method 370. Each block shown in FIG. 3C represents one or more processes, methods or subroutines, carried out in the exemplary method 370. The exemplary method 370 is described with respect to an application operating on a client device 102. However, one of ordinary skill in the art would recognize that the method 370 can be performed via a browser on a client device 102 as known in the art. The exemplary method 370 can begin at block 372.

At block 372, receive the modified instance file. For example, the template sharing module 132 receives modified instance file in response to the recipient exiting the instance file and/or in response to the recipient selecting a save menu option. After receiving the modified template instance file, the method 370 can proceed to block 374.

At block 374, determine if the submission is timely. For example, the template sharing module 132 can compare a timestamp associated with the modified template instance file and a deadline associated with the template file. The timestamp can be obtained from metadata associated with the modified template instance file. If the submission is timely, the method 370 can proceed to block 376. If the submission is not timely, the method 370 can proceed to block 378.

At block 376, store the timely modified instance template file. For example, the template sharing module 132 can cause the timely modified template instance file in a template folder associated with the template file.

At block 378, store the untimely modified instance template file. For example, the template sharing module 132 can cause the untimely modified template instance file in a separate template folder associated with the template file. For example, the separate template folder can be a folder different from timely modified template instance files. The separate template folder can be named, "Late Uploads". Alternatively, the template sharing module 132 can decline the submission and inform the recipient that the submission is untimely. For example, the template sharing module 132 can send an email message to the recipient and/or can cause the rendering of a message in a UI on the recipient's client device $102_i$. The message can notify the recipient that the submission is past the deadline.

While content management system 106 is presented with specific components, it should be understood by one skilled in the art, that the architectural configuration of system 106 is simply one possible configuration and that other configurations with more or less components are also possible. The term module can be software that resides in memory of the client device 102i and/or on one or more servers of the content management system 106 and performs one or more functions when a processor executes the software associated with the module. The memory can be a non-transitory computer-readable medium.

Figure 9A:
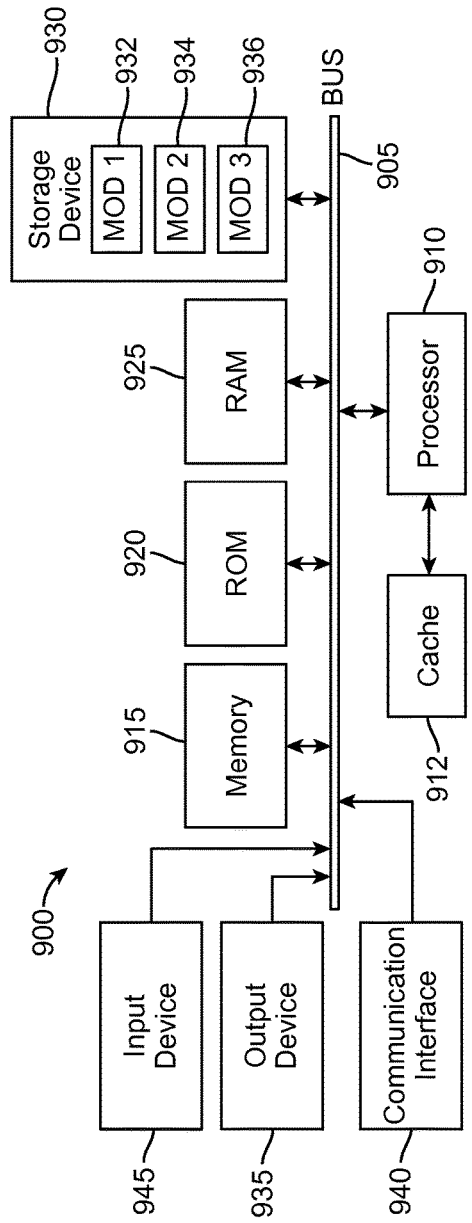
FIG. 9A shows block diagram of a system for implementing various embodiments of the present technology.
Figure 9B:
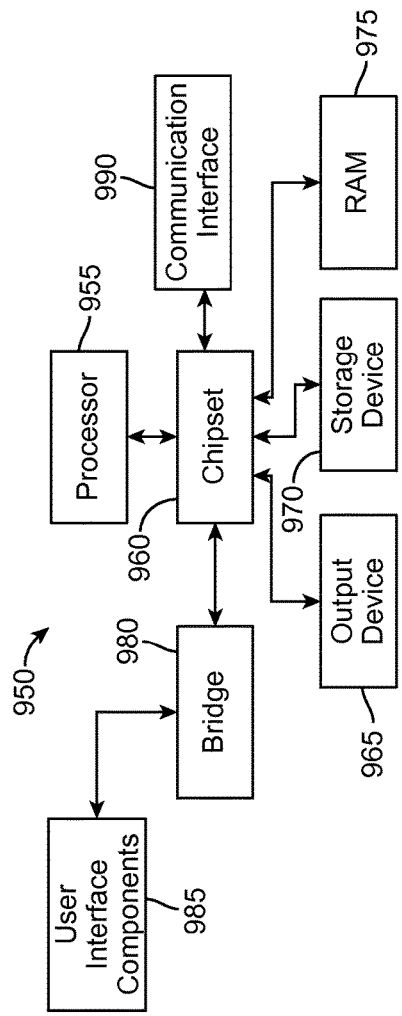
FIG. 9B shows an exemplary possible system embodiment for implementing various embodiments of the present technology.

FIGS. 9A and 9B show exemplary possible system embodiments. The more appropriate embodiment will be apparent to those of ordinary skill in the art when practicing the present technology. Persons of ordinary skill in the art will also readily appreciate that other system embodiments are possible.

FIG. 9A illustrates a conventional system bus computing system architecture 900 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B illustrates a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example.

Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 990 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    receiving, by a content management system, a command to share a selected file as a template file to one or more designated recipients;
    sending, by the content management system, a message having a link to each of the one or more designated recipients, wherein the link encodes a template file identifier identifying the template file;
    receiving, by the content management system, an indication that the link has been selected by a designated recipient of the one or more designated recipients;
    providing, by the content management system, a template instance file to a client device associated with the designated recipient;
    receiving, from the client device associated with the designated recipient, a modified template instance file;
    determining, by the content management system, whether the received modified template instance file is timely by comparing a timestamp associated with the modified template instance file and a deadline associated with the template file, wherein the modified template instance file is timely when the timestamp is before the deadline and the modified template instance file is untimely when the timestamp is after the deadline;
    storing, by the content management system, the received modified template instance file in a first folder when the received modified template instance file is determined to be timely; and
    storing, by the content management system, the received modified template instance file in a second folder when the received modified template instance file is determined to be untimely.

2. The method of claim 1, wherein the one or more designated recipients comprise one or more recipients associated with a shared folder in which the selected file is stored.

3. The method of claim 1, wherein
storing the received modified template instance file in the first folder comprises storing the modified template instance file in a shared folder.

4. The method of claim 3 wherein the modified template instance file is stored under a file name comprising a name of the designated recipient.

5. The method of claim 1, wherein providing the template instance file to the client device associated with the designated recipient comprises providing the template instance file for presentation via a webpage displayed using a web-browser application on the client device associated with the designated recipient.

6. The method of claim 1, wherein providing the template instance file to the client device associated with the designated recipient comprises providing the template instance file for presentation via a client-side application on the client device associated with the designated recipient.

7. The method of claim 1, further comprising, in response to receiving the command to share the selected file as the template file to the one or more designated recipients, providing a template user interface for sharing the template file, wherein the template user interface comprises one or more prompts to obtain information to associate with the template file and the message further comprises a note from a sharer of the template file entered into the template user interface.

8. The method of claim 1, wherein sending the message having the link to each of the one or more designated recipients comprises sending an email message to one or more designated email addresses corresponding to the one or more designated recipients.

9. The method of claim 1, further comprising:
determining, by the content management system, whether the template instance file already exists for the designated recipient in response to receiving the indication that the link has been selected by the designated recipient;
if the template instance file does not exist, generating, by the content management system, the template instance file for the designated recipient; and
if the template instance file does exist, retrieving, by the content management system, the template instance file for the designated recipient.

10. A system comprising:
at least one processor; and
a non-transitory computer readable storage medium comprising instructions that, when executed by the at least one processor, cause the system to:
receive a command to share a selected file as a template file to one or more designated recipients;
send a message having a link to each of the one or more designated recipients, wherein the link encodes a template file identifier identifying the template file;
receive an indication that the link has been selected by a designated recipient of the one or more designated recipients;
provide a template instance file to a client device associated with the designated recipient;
receive, from the client device associated with the designated recipient, a modified template instance file;
determine whether the received modified template instance file is timely by comparing a timestamp associated with the modified template instance file and a deadline associated with the template file, wherein the modified template instance file is timely when the timestamp is before the deadline and the modified template instance file is untimely when the timestamp is past the deadline;
store the received modified template instance file in a first folder when the received modified template instance file is determined to be timely; and
store the received modified template instance file in a second folder when the received modified template instance file is determined to be untimely.

11. The system of claim 10, wherein the one or more designated recipients comprise one or more recipients associated with a shared folder in which the selected file is stored.

12. The system of claim 10, wherein
storing the received modified template instance file in the first folder comprises storing the modified template instance file in a shared folder.

13. The system of claim 12, wherein the modified template instance file is stored under a file name comprising a name of the designated recipient.

14. The system of claim 10, wherein providing the template instance file to the client device associated with the designated recipient comprises providing the template instance file for presentation via a webpage displayed using a web-browser application on the client device associated with the designated recipient.

15. The system of claim 10, wherein providing the template instance file to the client device associated with the designated recipient comprises providing the template instance file for presentations via a client-side application on the client device associated with the designated recipient.

16. The system of claim 10, further comprising instructions that, when executed by the at least one processor, cause the system to, in response to receiving the command to share the selected file as the template file to the one or more designated recipients, provide a template user interface for sharing the template file, wherein the template user interface comprises one or more prompts to obtain information to associate with the template file and the message further comprises a note from a sharer of the template file entered into the template user interface.

17. The system of claim 10, wherein sending the message having the link to each of the one or more designated recipients comprises sending an email message to one or more designated email addresses corresponding to the one or more designated recipients.

18. A non-transitory computer readable storage medium comprising instructions that, when executed by at least one processor, cause a computing device to:
receive a command to share a selected file as a template file to one or more designated recipients;
send a message having a link to each of the one or more designated recipients, wherein the link encodes a template file identifier identifying the template file;
receive an indication that the link has been selected by a designated recipient of the one or more designated recipients;
provide a template instance file to a client device associated with the designated recipient;
receive, from the client device associated with the designated recipient, a modified template instance file;
determine whether the received modified template instance file is timely by comparing a timestamp associated with the modified template instance file and a deadline associated with the template file, wherein the modified template instance file is timely when the timestamp is before the deadline and the modified template instance file is untimely when the timestamp is past the deadline;

store the received modified template instance file in a first folder when the received modified template instance file is determined to be timely; and store the received modified template instance file in a second folder when the received modified template instance file is determined to be untimely.

19. The non-transitory computer readable storage medium of claim 18, wherein the one or more designated recipients comprise one or more recipients associated with a shared folder in which the selected file is stored.

20. The non-transitory computer readable storage medium of claim 18, wherein providing the template instance file to the client device associated with the designated recipient comprises providing the template instance file for presentation via a client-side application or via a webpage displayed using a web-browser application.

* * * * *